(12) United States Patent
Jensen (10) Patent No.: US 10,427,071 B1
(45) Date of Patent: *Oct. 1, 2019

(54) SKIMMING APPARATUS

(71) Applicant: ISM&M, Inc., Princeton, MN (US)

(72) Inventor: Jonathan Allen Jensen, Princeton, MN (US)

(73) Assignee: ISM&M, Inc., Princeton, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/853,274

(22) Filed: Dec. 22, 2017

Related U.S. Application Data

(63) Continuation of application No. 15/010,274, filed on Jan. 29, 2016, now Pat. No. 9,849,410, which is a continuation of application No. 14/034,155, filed on Sep. 23, 2013, now Pat. No. 9,248,388.

(51) Int. Cl.
| | |
|---|---|
| *C02F 1/40* | (2006.01) |
| *B01D 33/04* | (2006.01) |
| *B01D 17/02* | (2006.01) |
| *B01D 33/46* | (2006.01) |
| *B01D 21/24* | (2006.01) |
| *B01D 21/00* | (2006.01) |
| *B08B 1/00* | (2006.01) |
| *E02B 15/10* | (2006.01) |
| *B08B 9/023* | (2006.01) |

(52) U.S. Cl.
CPC ......... *B01D 33/04* (2013.01); *B01D 17/0214* (2013.01); *B01D 21/0012* (2013.01); *B01D 21/2433* (2013.01); *B01D 33/466* (2013.01); *B08B 1/005* (2013.01); *B08B 9/023* (2013.01); *C02F 1/40* (2013.01); *E02B 15/104* (2013.01); *B08B 2209/02* (2013.01)

(58) Field of Classification Search
CPC ... B01D 17/0202; B01D 17/0214; C02F 1/40; E02B 15/104; B08B 1/005; B08B 9/023; B08B 2209/02
USPC ......... 210/242.3, 242.4, 526, 540, 776, 923, 210/924; 15/104.4, 236.01, 236.07
See application file for complete search history.

(56) References Cited

U.S. PATENT DOCUMENTS

| | | |
|---|---|---|
| 654,965 A | 7/1900 | Franke |
| 782,065 A | 2/1905 | Shaler |
| 1,624,092 A | 4/1927 | Coleman |
| 1,748,541 A | 2/1930 | Davitt |
| 2,045,511 A | 6/1936 | Babcock |
| 3,508,663 A | 4/1970 | Brill |
| 3,617,552 A | 11/1971 | Will et al. |
| 3,643,804 A | 2/1972 | Sharpton |
| 3,695,451 A | 10/1972 | Schmidt et al. |
| 4,089,784 A | 5/1978 | Ettelt et al. |
| 4,268,396 A | 5/1981 | Lowe |

(Continued)

OTHER PUBLICATIONS

Zebra Sidewinder® Tube Skimmer, Sidewinder™ Tube Oil Skimmer—Mechanical Oil Skimmer Separates Oil from Coolant, Sep. 13, 2013, 2 pages (www.zebraskimmers.comoil_skimmer—products/tube_oil_skimmer.html).

(Continued)

*Primary Examiner* — Christopher Upton
(74) *Attorney, Agent, or Firm* — Fish & Richardson P.C.

(57) ABSTRACT

A skimming apparatus with a pivot arm and a drive follower on the pivot arm that guides a belting to facilitate precise placement of the belting for efficient skimming.

11 Claims, 9 Drawing Sheets

(56) References Cited

U.S. PATENT DOCUMENTS

| | | | |
|---|---|---|---|
| 4,274,957 A | 6/1981 | Koller | |
| 4,915,823 A | 4/1990 | Hall | |
| 5,062,953 A | 11/1991 | Lewan | |
| 5,146,717 A * | 9/1992 | Shemesh | B08B 9/021 15/104.04 |
| 5,164,083 A | 11/1992 | Ahrendt | |
| 5,236,585 A | 8/1993 | Fink | |
| 5,645,733 A | 7/1997 | Hobson | |
| 5,881,419 A * | 3/1999 | Millard | B08B 9/023 15/104.04 |
| 5,928,520 A | 7/1999 | Haumesser | |
| 5,989,422 A | 11/1999 | Hobson | |
| 6,261,451 B1 | 7/2001 | Genevrino | |
| 6,434,776 B1 * | 8/2002 | Pfeiffer | B23B 5/168 15/104.04 |
| 6,616,835 B2 | 9/2003 | Jensen | |
| 6,800,195 B1 | 10/2004 | Batten | |
| 6,887,387 B2 | 5/2005 | Hobson | |
| 6,962,659 B2 | 11/2005 | Rhein et al. | |
| 7,296,694 B2 | 11/2007 | Weymouth | |
| 7,431,166 B2 | 10/2008 | Davidian | |
| 7,651,001 B2 | 1/2010 | Davidian | |
| 9,248,388 B1 | 2/2016 | Jensen | |
| 9,849,410 B1 * | 12/2017 | Jensen | B01D 17/0214 |
| 2011/0309030 A1 | 12/2011 | Dorman | |

OTHER PUBLICATIONS

Zebra Sidewinder® Tube Oil Skimmer for Metalworking Machine Sumps, Sep. 13, 2013, 2 pages (www.zebraskimmers.com/video/tube_skimmer_video_htm).

Oil Skimmers, Inc. OSI Environmental, Model 5H Compact Oil Skimmer, Sep. 13, 2013, 5 pages (www.oilskim.com/model-5h-compact-oil-skimmer).

Oil Skimmers, Inc., OSI Environmental, Model 6V Brill Oil Skimmer, Sep. 13, 2013, 6 pages (wwww.oilskim.com/model-6v-brill-oil-skimmers).

Abanaki Oil Skimmers, Coolant Skimmers & Accessories, Tramp Oil Skimmers/Abanaki Corporation, Sep. 13, 2013, 6 pages (www.abanaki.com/coolant_products.html#TubeTastic.

* cited by examiner

SKIMMING APPARATUS

CROSS-REFERENCE TO RELATED APPLICATIONS

This application is a continuation application of, and claims priority to, U.S. patent application Ser. No. 15/010,274, now U.S. Pat. No. 9,849,410, titled "Skimming Apparatus," filed on Jan. 29, 2016, which is a continuation application of, and claims priority to, U.S. patent application Ser. No. 14/034,155, now U.S. Pat. No. 9,248,388, titled "Skimming Apparatus," filed on Sep. 23, 2013. The disclosure of the foregoing applications are incorporated herein by reference in their entirety for all purposes.

BACKGROUND

This specification relates to material skimmers, and in particular fluid skimmers.

Often during industrial operations a first fluid becomes contaminated with a waste fluid. When the first fluid is of relatively high value compared to the waste fluid, a manufacturer will utilize a remediation process to separate the fluids. One such remediation process is skimming, and this particular process is used when the fluids are insoluble and the waste fluid is of less density and lighter weight than the first fluid so that the waste fluid forms a layer on top of the first fluid.

For example, many industrial machines utilize coolant fluids to facilitate particular machining and metal cutting operations and use separate way lubes and hydraulic fluids to reduce machine wear. To illustrate, machines such as mills, lathes and drills for example will utilize a coolant to cool cutting tools at the point of cut. The coolant is used to wet the surfaces and is drained into a receiving vessel, such as a sump, and is recirculated. These cutting machines also utilize a lubricating oil to lubricate the cutting machine parts. The lubricating oils mixes in with the coolant and are also collected in the same receiving tank. Due to the different densities and weights of the fluids, the lubricating oil forms a surface layer on top of the coolant. These coolants are more expensive than the lubricating oil and can be easily recycled compared to lubricating oils. The presence of the lubricating oil, over time, reduces the life of the coolant. As a result, manufacturers want to remove this contaminating lubricating oil from the coolant. There is also a presence of floating particulate, chips and other solid contaminates in the contaminating lubricating oil. One such way of removing the lubricating oil, commonly referred to as "tramp oil," and other floating contaminates, is by the use of a skimmer that introduces a driven belt with an affinity for the tramp oil on the surface of coolant fluids. The tramp oil and many solid contaminates are then carried away as the belt is driven to a scraper. The scraper scrapes the tramp oil from the belt, and the scraped oil and particulate is collected in a receiving vessel.

SUMMARY

In general, one innovative aspect of the subject matter described in this specification can be embodied in an apparatus including a housing including a belt ingress and a belt egress and a drive apparatus in operative alignment with the belt ingress and the belt egress; a pivot arm having first and second ends defining a longitudinal axis, the first end pivotally connected to the housing by a pivot connection and operable to pivot about a pivot axis of the pivot connection; a drive follower in a tensioned slidable engagement with the second end the pivot arm so that the drive follower is in slidable disposition along the longitudinal axis of the pivot arm, the tensioned slidable engagement having an outward bias that causes the drive follower to dispose outwardly from the second end of the pivot arm; an endless round belting in driving engagement with the driver follower and the drive apparatus through the belt ingress and the belt egress, the endless round belting having a round cross section of a first diameter and having a lengthwise circumference that causes the endless round belting to apply an opposite tension to the drive follower that acts against the outward bias of the tensioned slidable engagement of the drive follower; and a first scraper connected to the housing and having an engagement surface offset from the pivot axis and the belt ingress, the offset such that the engagement surface engages the endless round belting and directs the endless round belting into the belt ingress for substantially an entire operable pivot range of the pivot arm about the pivot axis.

Another innovative aspect of the subject matter described in this specification can be embodied in an apparatus including a housing including a housing including a belt ingress and a belt egress and a drive apparatus in operative alignment with the belt ingress and the belt egress, the drive apparatus defining a drive plane; a pivot arm having first and second ends defining a longitudinal axis, the first end pivotally connected to the housing by a pivot connection and operable to pivot about a pivot axis of the pivot connection and over a range that includes the longitudinal axis of the pivot arm being substantially parallel to the drive plane to the longitudinal axis of the pivot arm to being substantially perpendicular to the drive plane; a drive follower in a tensioned slidable engagement with the second end the pivot arm so that the drive follower is in slidable disposition along the longitudinal axis of the pivot arm, the tensioned slidable engagement having an outward bias that causes the drive follower dispose outwardly from the second end of the pivot arm; an endless round belting in driving engagement with the driver follower and the drive apparatus through the belt ingress and the belt egress, the endless round belting having a round cross section of a first diameter and having a lengthwise circumference that causes the endless round belting to apply an opposite tension to the drive follower that acts against the outward bias of the tensioned slidable engagement of the drive follower; a first scraper connected to the housing and having an engagement surface offset from the pivot axis and the belt ingress, the offset such that the engagement surface engages the endless round belting and directs the endless round belting into the belt ingress for substantially an entire operable pivot range of the pivot arm about the pivot axis; and a second scraper forming a substantially circular interior aperture through which the endless round belting penetrates and that engages the outer surface of the endless round belting.

Another innovative aspect of the subject matter described in this specification can be embodied in an apparatus including a housing including means for driving an endless round belting into the housing and out of the housing; a pivot arm having first and second ends defining a longitudinal axis, the first end pivotally connected to the housing by a pivot connection and operable to pivot about a pivot axis of the pivot connection and over a range that includes the longitudinal axis of the pivot arm; a drive follower; means for tensioning the drive follower in slidable engagement with the pivot arm in slidable disposition along the longitudinal axis of the pivot arm and causing an outward bias that causes the drive follower dispose outwardly from the second end of the pivot arm; an endless round belting in driving engagement with the means for driving and the drive follower, the endless round belting having a round cross section of a first diameter and having a lengthwise circumference that causes the endless round belting to apply an opposite tension to the drive follower that acts against the outward bias of the tensioned slidable engagement of the drive follower; and means for scraping the endless round belting, the means for scraping including means for adjusting a scraping surface to a diameter that is tensioned matched to first diameter of the endless round belting and during actuation of the means for driving matches variations of the first diameter of the endless round belting.

Particular embodiments of the subject matter described in this specification can be implemented so as to realize one or more of the following advantages. The housing and baseplate unit can be used without a specially designed receiving vessel and need not be clamped or rigidly affixed to a general purposes receiving vessel. For example, the housing and baseplate unit can be placed atop a five-gallon pail.

In implementations that use a drive wheel as a drive apparatus, a drive wheel with a diameter ratio in the range of 12:1-18:1 to the cross sectional diameter of the endless round belt allows for increased pulling capability when using higher durometer elastomeric belts. These higher durometers belts would otherwise induce high stresses with small ratio configurations. The higher diameter ratio also facilitate slight compression of the endless round belt between the drive wheel and a drive aperture, which, in turn, allows for a gear motor with higher torque for use with a larger diameter wheel. Thus, the larger the wheel, the slower the motor RPM to produce the same output speed of a proportionately smaller wheel.

The drive aperture and the drive wheel are of such diameters that the endless round belt is compressed into the drive wheel during rotation. This allows for the use of stiffer, and more resilient, materials for the endless round belting, which, in turn, leads to less binding. In particular, a higher durometer elastomeric round belting, either solid or hollow, can be used. Due to wall thickness of the hollow belting and solid core belting of this particular belting material, the belt is resistance to mechanical forces and stresses such as elongation, weld breakage, general wear and other mechanical failures that can occur. In addition to having an affinity for waste materials, such as tramp oil, hydrocarbons, fuels, or other lighter floating waste material, the belting material has a wide temperature range over which it can operate. The material is also resistant to fluids that may have very aggressive chemical make ups.

The pivotal ration of the pivot arm allows for controlled and precise submersion of the drive follower and thus the endless round belting during transit. Floating fluids and oils are naturally attracted to an area of surface interruption, and thus the pivot arm allows for the advantage of a direct and controlled breaking the surface tension due to submersion of the entry side of the endless round belt. The exiting side of the endless round belt breaks surface as well, and because the belt is submerged into the fluid to be remediated, the belt is wetted as it transitions from the fluid layer of the remediation fluid into the fluid layer of the waste fluid. The wetting improves affinity for waste fluids, such as oil and fuel. Furthermore, the entire diameter of the belt is fully surrounded with waste, thus overcoming disadvantages of systems in which the skimming belt only floats on the surface of waste material.

The pivot arm and the drive follower that is in tensioned slidable engagement with the pivot arm can be extended to a variety of lengths and planes to reach distances and depths. Because of the rigidity of the belt under tension, the belt tends to not rub against other surfaces, such as walls of vessels from which fluid is being skimmed. This allows for precision placement of the belting, such as through small openings, while ensuring that the belting will not catch or bind on edges of the opening. Furthermore, because of the rigidity of the belting made from higher durometer elastomeric materials, there is relatively little belt stretching, which allows for a shorter length tensioning system to be fully effective than would be required for softer, more elastic belts.

When a rigid belting is used, such as the higher durometer elastomeric round belting, a tensioned scraper that has a scraping aperture that tension matches the cross sectional diameter of the higher durometer elastomeric round belting can be used. The tension scraper provides for a high degree of scraping, but also results in little wear to the belting surface, thus extending the service life of the endless round belting.

A standoff scraper, in addition to the tensioned scraper, precludes the belting from premature scraping against nearby receiving vessel walls, and also facilitates guiding of the belt through an entire operational pivot range.

In some implementations, a receiving vessel includes a gravity displacement system that facilitates separation of fluids and substances for waste disposal and fluid remediation. The gravity displacement eliminates the need for volumetric or fluid level monitoring, and ensures that the receiving vessel does not overflow. This, in turn, reduces clean-up costs associated with hazardous material spills.

The advantages listed above are not an exhaustive list of advantages. Furthermore, the advantages listed above are not required to be realized in particular implementations of the subject matter described herein.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements. To avoid congestion in the drawings, certain numbered callouts introduced in a particular drawing may be omitted in subsequent drawings.

DETAILED DESCRIPTION

Figure 1:
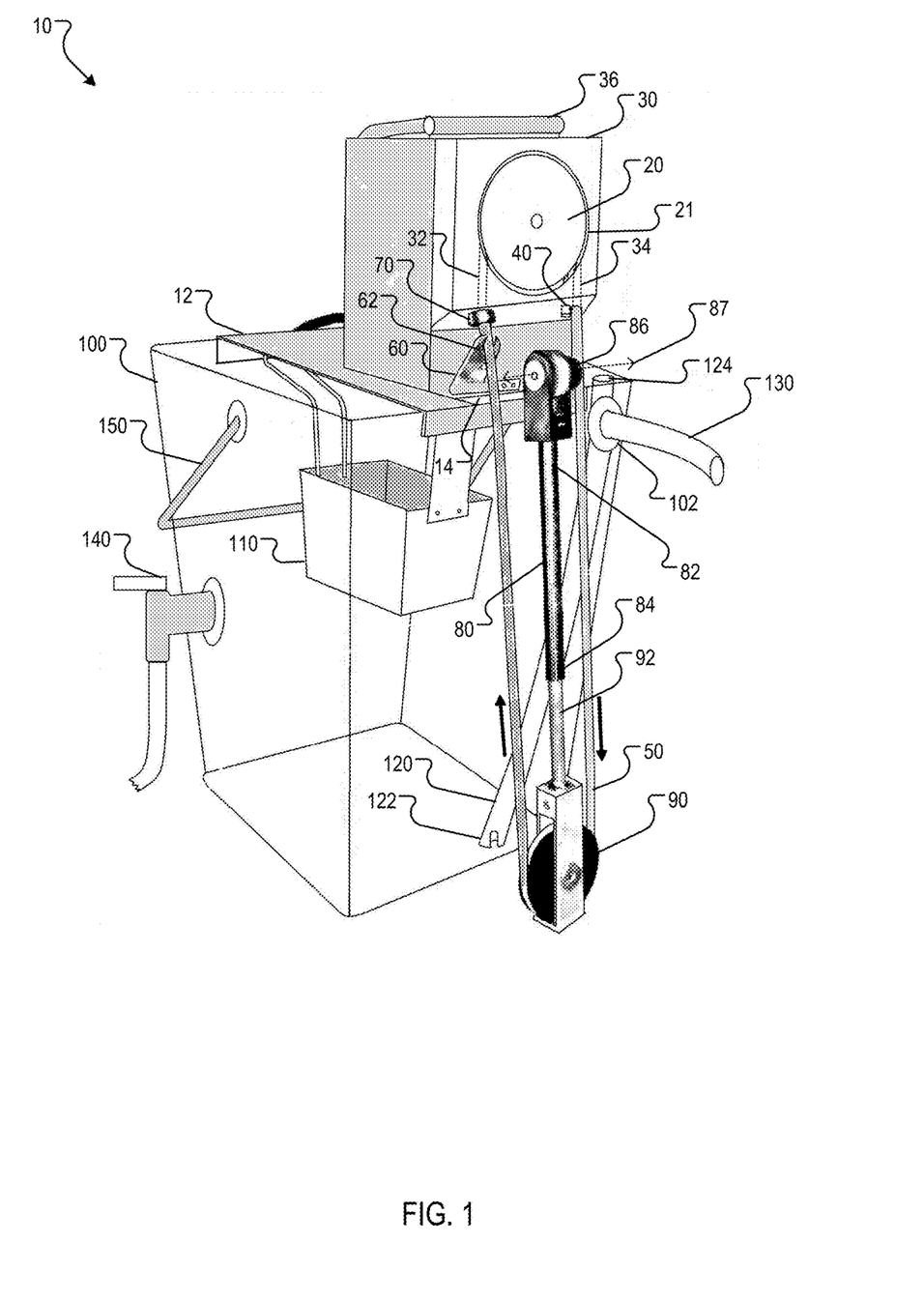
FIG. 1 is a perspective view of a skimming apparatus with a pivot arm at a first pivot angle.

FIG. 1 is a perspective view of a skimming apparatus 10 with a pivot arm 80 at a first pivot angle. The skimming apparatus 10 includes a housing 30. The housing 30 has a belt ingress 32 and a belt egress 34, and a drive apparatus 20 in operative alignment with the belt ingress 32 and the belt egress 34. In the implementation of FIG. 1, the drive apparatus 20 is a drive wheel 20 and operates within a drive aperture 21. The drive wheel 20 defines a vertical plane in parallel alignment with the flat cross section of the drive wheel 20 such that tangents to the circular shape of the drive wheel parallel to the plane. A variety of appropriate materials may be used to construct the drive wheel 20. For example, the wheel 20 may be made of polypropylene, aluminum, steel, or other materials or combinations of materials.

A pivot arm 80 has a first end 82 and a second end 84 defining a longitudinal axis. The first end 82 is pivotally connected to the housing 30 by a pivot connection 86 and is operable to pivot about a pivot axis 87 of the pivot connection 86. A drive follower 90 is in a tensioned slidable engagement by an extension 92 with the second end 84 the pivot arm 80 so that the drive follower 90 is in slidable disposition along the longitudinal axis of the pivot arm 80. The tensioned slidable engagement has an outward bias that causes the drive follower 90 to dispose outwardly from the second end 84 of the pivot arm 80.

In the example implementation shown, the drive follower 90 is a wheel; however, other drive follower devices can be used, depending on the belting 50 used. For example, the drive follower may be a smoothed surfaced with a curved engagement area of sufficient radius that allows the belting 50 to traverse the surface and change the path direction by 180 degrees without kinking or binding. Alternatively, a bearing surface of multiple recessed bearings may be used. Still other appropriate followers may be used. As with the drive wheel 20, the follower 90 can be made from a variety of appropriate materials.

The belting 50 can be a flat belt or a round belt, depending on the drive apparatus 20 and the drive follower 90 used. Whether flat or round, a variety of materials may be used for the belt. In some implementations, a higher durometer elastomeric belting is used; however, other materials can be used for round belting. For illustrative purposes, an endless round belting of higher durometer elastomeric is described. However, other appropriate belts and drive configurations can be used.

The belting 50 is in driving engagement with the driver follower 90 and the drive apparatus 20 through the belt ingress 32 and the belt egress 34. In implementations in which an endless round belting is used, the endless round belting 50 has a round cross section of a first diameter and has a lengthwise circumference that causes the endless round belting 50 to apply an opposite tension to the drive follower 90. This opposite tension acts against the outward bias of the tensioned slidable engagement of the drive follower 90.

A first scraper 60 is connected to the housing 30 and has an engagement surface 62 offset from the pivot axis 87 and the belt ingress 32. The offset is such that the engagement surface 62 engages the endless round belting 50 and directs the endless round belting 50 into the belt ingress 32 for substantially an entire operable pivot range of the pivot arm 80 about the pivot axis 87. In some implementations, the operable pivot range of the pivot arm 80 is a first position in which the longitudinal axis of the pivot arm 80 is substantially parallel to the drive plane of the driving apparatus 20, e.g., substantially vertically downward, as illustrated in FIG. 1, to a second position is which the longitudinal axis of the pivot arm 80 substantially perpendicular to the drive plane of the driving apparatus 20, e.g., substantially horizontally outward, as illustrated by the extension line 81 in FIG. 2. As the belting 50 moves across the engagement surface 62, waste material is scraped from the surface of the belting 50.

The skimming apparatus 10 also includes a second scraper 70. As will be described with reference to FIG. 6 below, the second scraper is tension matched to the belting 50 and also removes waste material from the surface of the belting 50.

Within the housing 30 is an electric gear driven motor (not shown) that can vary in speed for selected applications. The skimmer apparatus 10 also includes a handle 36 for easy lift and transport.

The skimming apparatus 10 can also include a support mount 12 attached to a bottom surface of the housing 30. The support mount 12 defines a receiving opening 14 through which material scraped from the first scraper 60 and the second scraper 70 are received. The support mount 12 has outer edges within which a top opening of a receiving vessel 100 can be received.

The receiving vessel 100, in some implementations, includes a return drop pipe 120 and has a first opening 122 substantially near a bottom surface of an interior of the receiving vessel 100 and having a second opening 124 at the top to prevent airlock and facilitate gravity return. The return drop pipe 120 also has another opening (not shown) below the second opening 124 and in communication with a side opening 102 in a side wall of the receiving vessel 100. The side opening 102 is below the receiving opening 14 of the support mount 12 when the support mount 12 receives the receiving vessel 100 and the second opening 124. A gravity return hose 130 is connected to the side opening 102 on an exterior of the receiving vessel.

The return drop pipe 120 and the location of the side opening 102 allows for gravity return of reclamation fluid. At the beginning of a skimming operation, the receiving vessel may be partially (or fully) filled with reclamation fluid (e.g., coolant). As waste fluid is scraped from the scrapers 60 and 70 and collected in the receiving vessel 100, the waste fluid displaces the reclamation fluid until the reclamation fluid flows out of the second opening of the pipe 120, then through the side opening 102 and into the gravity return hose 130. The gravity return hose is placed over the surface being skimmed, so that the reclamation fluid displaced from the vessel 100 is collected in the vessel containing the fluid being skimmed. This results in near constant levels of fluid in both vessels, and eliminates overflow of the receiving vessel 100. For example, as shown in FIG. 2, as waste fluid 210 is collected, the reclamation fluid 212 is displaced into the return drop pipe 120 and exits the gravity return hose, as indicted by the fluid path arrows 121 and 131.

Figure 2:
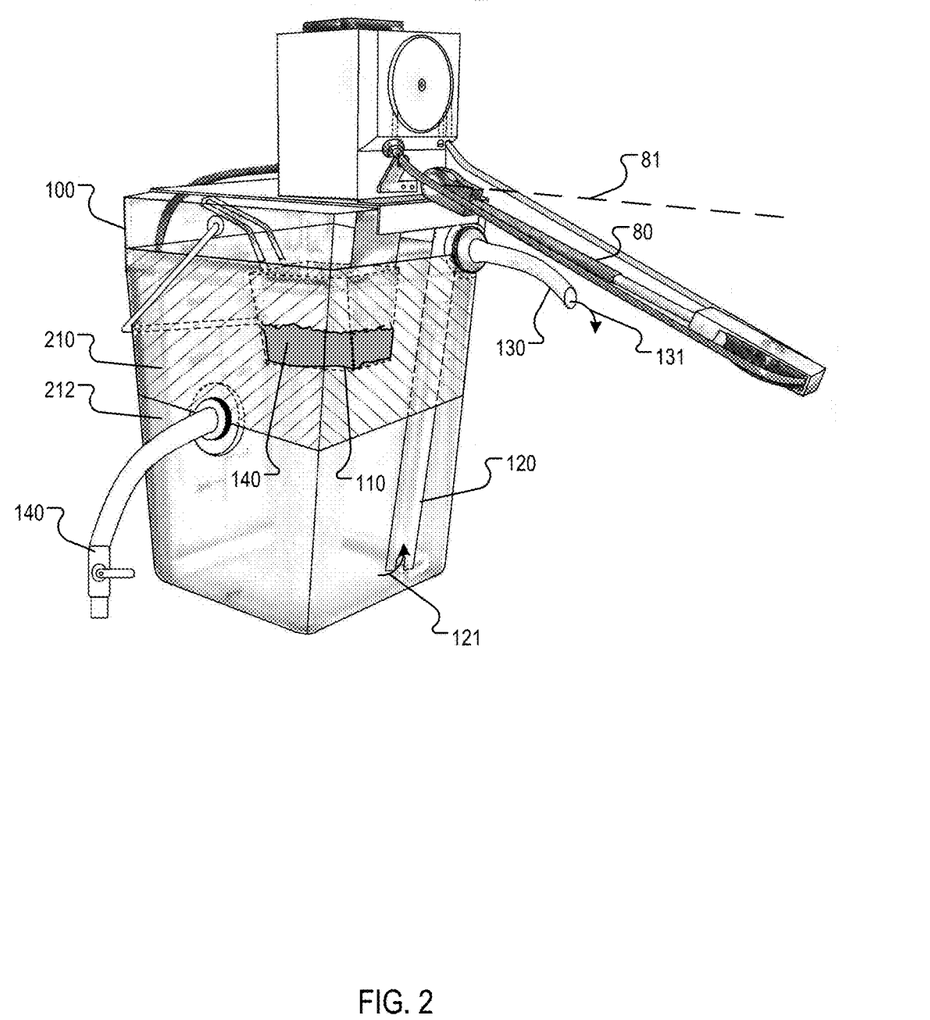
FIG. 2 is a perspective view of the skimming apparatus with a pivot arm at a second angle.

Also, as shown in FIGS. 1 and 2, the receiving vessel 100 can include a drain valve 140 connected to a side wall of the receiving vessel 100 and positioned approximately at a depth sufficient to drain only the scraped liquid 210 that is of less density than a second liquid 212 from which the scraped liquid 210 is being separated, and to retain the second liquid 212. Additionally, a straining basket 110 can be mounted below the receiving opening 14 of the support mount 12. The straining basket 110 can be a straining material that passes liquid material received through the receiving opening 14, but that retains sufficiently sized solid materials 140, such as dirt, metal fines, shavings and chips, etc., received through the receiving opening.

The vessel 100 may be made of a variety of appropriate materials, ranging from steel vessels to clear polycarbonate vessels. The latter may have fluid measured markings in increments to facilitate visual inspection for easily determining the amounts of each fluid and when to empty via the drain valve 140.

Figure 3:
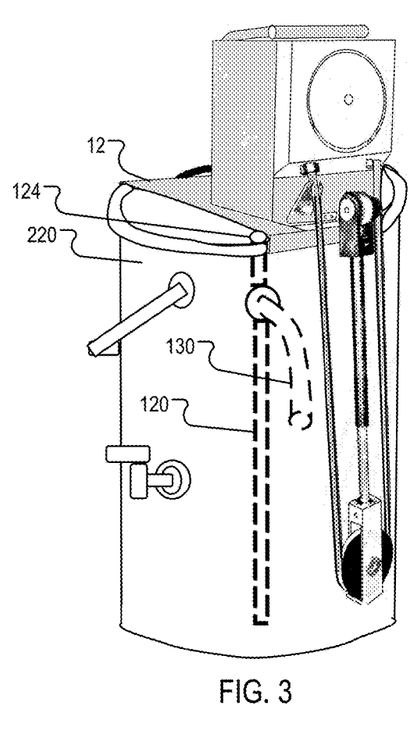
FIG. 3 is a perspective view of the skimming apparatus mounted on a pail.

The support mount 12 may be of sufficient peripheral dimensions to accommodate a variety of receiving vessels. For example, as shown in FIG. 3, a standard five gallon pail 220 can be used as a receiving vessel. The pail may optionally include a return drop pipe 120 and an external hose 130, which are shown in phantom, or can be used without the return drop pipe 120 and hose 130.

Figure 4:
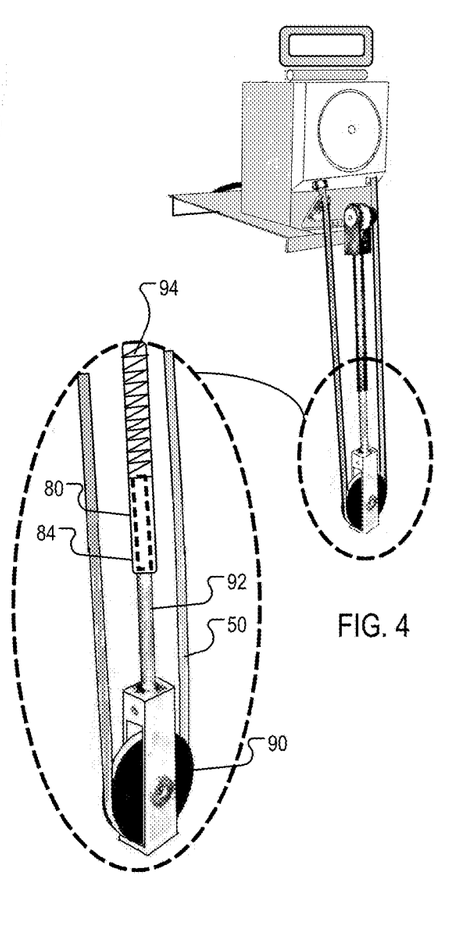
FIG. 4 is a detailed view of a drive follower in tensioned slidable engagement with the pivot arm.

FIG. 4 is a detailed view of a drive follower 90 in tensioned slidable engagement with the pivot arm 80. In this example implementation, the second end 84 of the pivot arm 80 is a sleeve and within the sleeve a tension spring 94 is inserted. The extension 92 is received in the second end 84 and is in tension against the tension spring 94 as the tension spring 94 applies an outward tension. The belting 50 is of an outer circumference so as to counteract the tension of the tension spring 94. A variety of different lengths of the pivot arm 80 may be made available to accommodate different belt lengths. Alternatively, the length of the pivot arm 80 may be adjustable to accommodate different sized belts.

Figure 5:
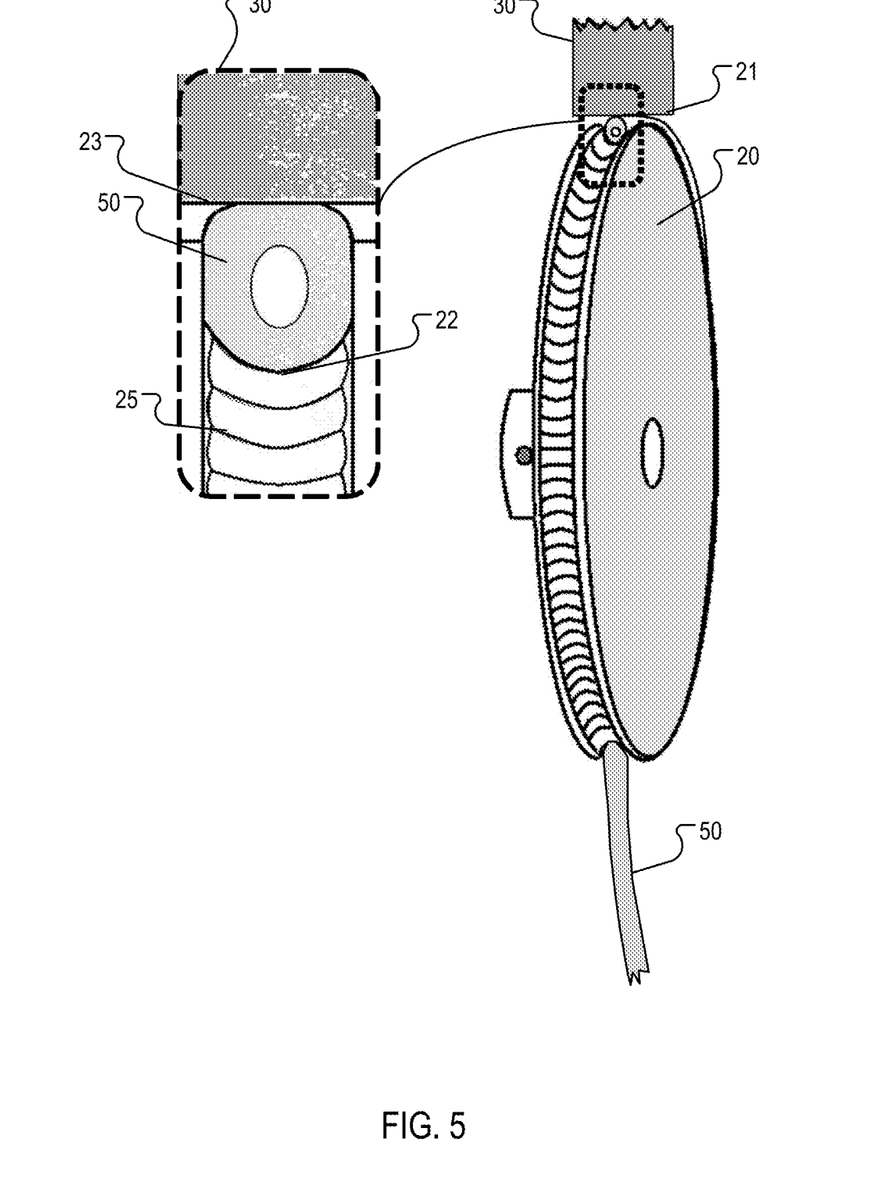
FIG. 5 is a detailed view of the belting within an area between a drive wheel and drive aperture.

FIG. 5 is a detailed view of the belting 50 within an area between a drive wheel 20 and drive aperture 21. The drive wheel 20 is disposed within the drive aperture 21. The diameter of the drive wheel 20 and the diameter of the drive aperture 21 are such that the endless round belting 50 engages both an outer surface 22 of the drive wheel 20 and an inner surface 23 of the drive aperture. For example, the difference of the diameters of the drive wheel 20 and the aperture 21 may, in some implementations, be smaller than the cross sectional diameter of the belting 50 so that the belting 50 is compresses between the outer surface 22 of the drive wheel 20 and the inner surface 23 of the periphery 21.

The outer surface 22 of the drive wheel can include engagement surfaces 25 to actively engage the endless round belting 50 to assist in pulling the belting in the direction or rotation of the drive wheel 20. In some implementations in which a single drive wheel 20 is used, the belting 50 is compressed between the outer surface 22 of the drive wheel 20 and the inner surface 23 of the periphery 21 for approximately 180 degrees of the drive wheel. The combination of these engagement surfaces and the compression produces a positive drive and eliminates the need for additional wheels, guide pins or gears.

In some implementations, the ratio of the diameter of the drive wheel to first diameter of the endless round belting is within the range of 12:1 to 18:1, or even larger. These ratios facilitate the use of higher durometer elastomeric round belting. Smaller ratios with more flexible belting, however, can also be used.

Figure 6:
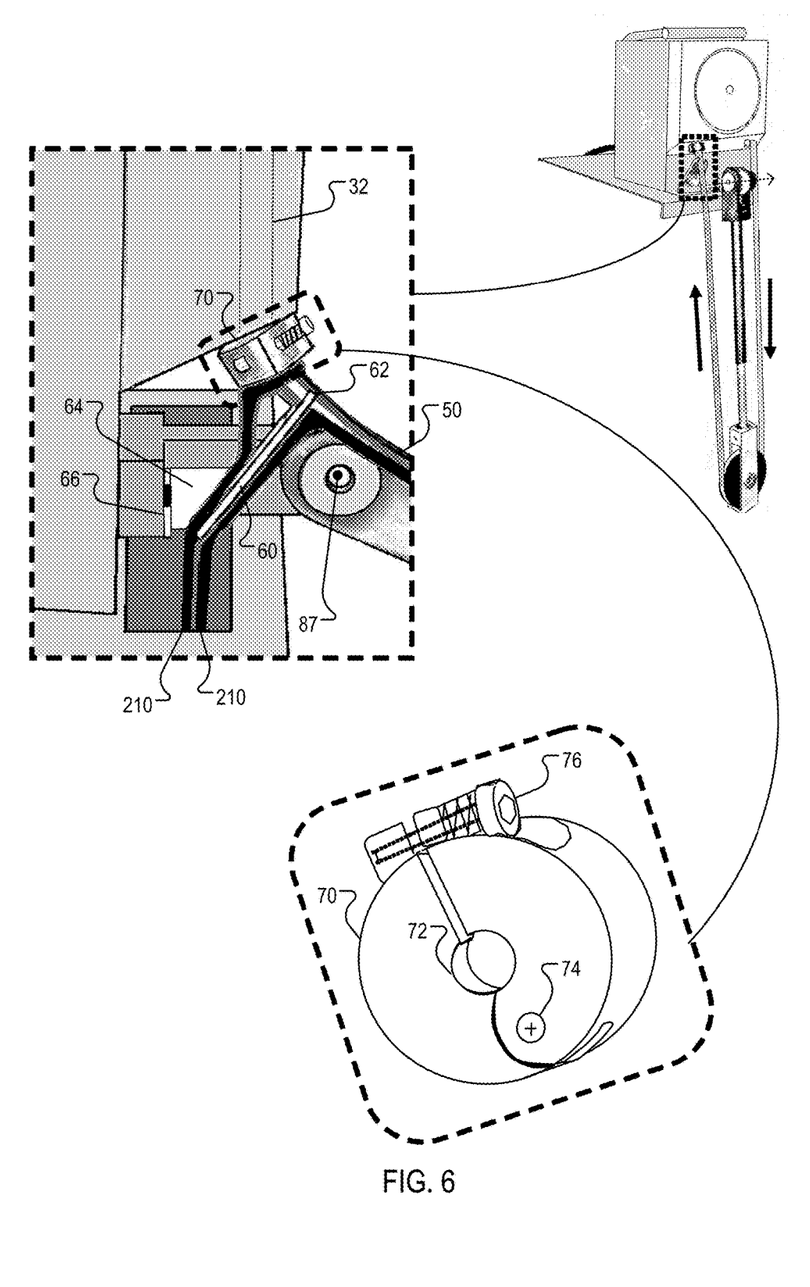
FIG. 6 is a detailed view of first and second scrapers and their relative dispositions during operation.

FIG. 6 is a detailed view first scraper 60 and the second scraper 70 and their relative dispositions during operation. The first scraper 60 is angled extension with the engagement surface 62 in contact with the belting 50. The position of the engagement surface 62 relative to the pivot axis 84 is such that the belting 50 is in contact with the engagement surface over the entire operable pivot range of the pivot arm 80. The operable pivot range is, in some implementations, is a range from a first position in which the longitudinal axis of the pivot arm 80 is substantially parallel to the drive plane of the driving apparatus 20, e.g., substantially vertically downward to a second position is which the longitudinal axis of the pivot arm 80 substantially perpendicular to the drive plane of the driving apparatus 20. However, other ranges can be used. For example, varying the position of the engagement surface 62 relative to the pivot axis may alter the operational range.

The engagement surface 62 is in the form of a semi-circular recess that receives the belting 50. Other surfaces that serve to guide the belting 50 can also be used. For example, the engagement surface 62 can be in the form of an aperture the completely receives the belting 50. Alternatively, the engagement surface 62 can be in the form of a rectangular recess that receives the belting 50 but allows for side-to-side play when guiding the belting into the second scraper 70 or into the belt ingress 32 if a second scraper 70 is not used. The first scraper 60 may include a flange extension 64 with a mounting bend 66 for mounting on the housing 30. This allows waste fluid 210 scraped from the scraper engagement surface 62 to traverse the bottom of the angled extension, and waste fluid scraped from the scraper 70 to fall and traverse the top surface of the angled extension without collecting where the scraper attaches to the housing 30.

In some implementations, the second scraper 70 is proximate to the first scraper 60 so that skimmed material scrapped from the second scraper 70 discharges onto the top surface of the angled extension. In some implementations, the second scraper 70 defines a fixed aperture diameter slightly undersized to the outer diameter of the belting 50, and is attached to the housing. As the belting 50 traverses through the aperture, waste material is scraped from the belting 60.

In other implementations, the second scraper 70 has an adjustable aperture 72 that is adjusted so that it is undersized to the diameter of the belting 50 and, by use of a tensioning device, is tension matched to the outer diameter of the belting 50. The second scraper 70 can be two circular halves that are connected by a hinge 74, and a tensioned adjuster 76, such as a screw with an assisting spring, adjusts the adjustable second diameter. The tensioned adjuster 76 tends to pull the two circular halves together. Thus, as the round belting penetrates the interior aperture 72, and the adjustable second diameter is adjustable to a diameter that is slightly undersized to the outer diameter of the belting 50 so that it becomes tensioned matched to diameter of the belting 50 during operation. As used here, the term "tension matched" means that the circular halves pull together to follow the outer diameter of the belting 50. The belting 50 may, as a result, be slightly compressed as it engages the surfaces of the interior aperture. The tensioned adjuster 76 allows for the adjustable second diameter to adjust and thereby match variations of the first diameter of the round belting. This results in more efficient scraping of the belting 50 than a static aperture scraper, and also reduces wear on the belting 50.

In some implementations, the second scraper 70 with the adjustable aperture 72 and the tensioned adjuster 76 can be affixed to the belting 60 between the engagement surface 62 and the belt ingress 32, and is not attached to the housing 30. When the drive apparatus 20 pulls the belting 50 inward, the second scraper 70, attached to the belting 50, abuts the surface of the housing 30. Alternatively, the second scraper 70 with the adjustable aperture 70 and the tensioned adjuster 76 can be attached to the housing.

The second scraper 70 also tends to apply resistance against the drive apparatus 20, which causes the belting 50 to better engage the drive apparatus 20. In the case of the drive wheel being the drive apparatus 20, for example, the resistance causes the belting 50 to seat into a wheel groove of the drive wheel.

Returning now to FIG. 1, the skimming apparatus 10 can also include a tensioned disengagement pin 40 proximate to the belt egress 34. The disengagement pin 40 is positioned to have its longitudinal axis substantially parallel to the longitudinal axis of the belt egress 34. The tensioned disengagement pin 40 in tensioned contact with the outer surface 22 of the drive wheel 20 to facilitate disengagement of the belting 50 from the outer surface 22 of the drive wheel 20 to follow the longitudinal axis of the belt egress 34.

Figure 7:
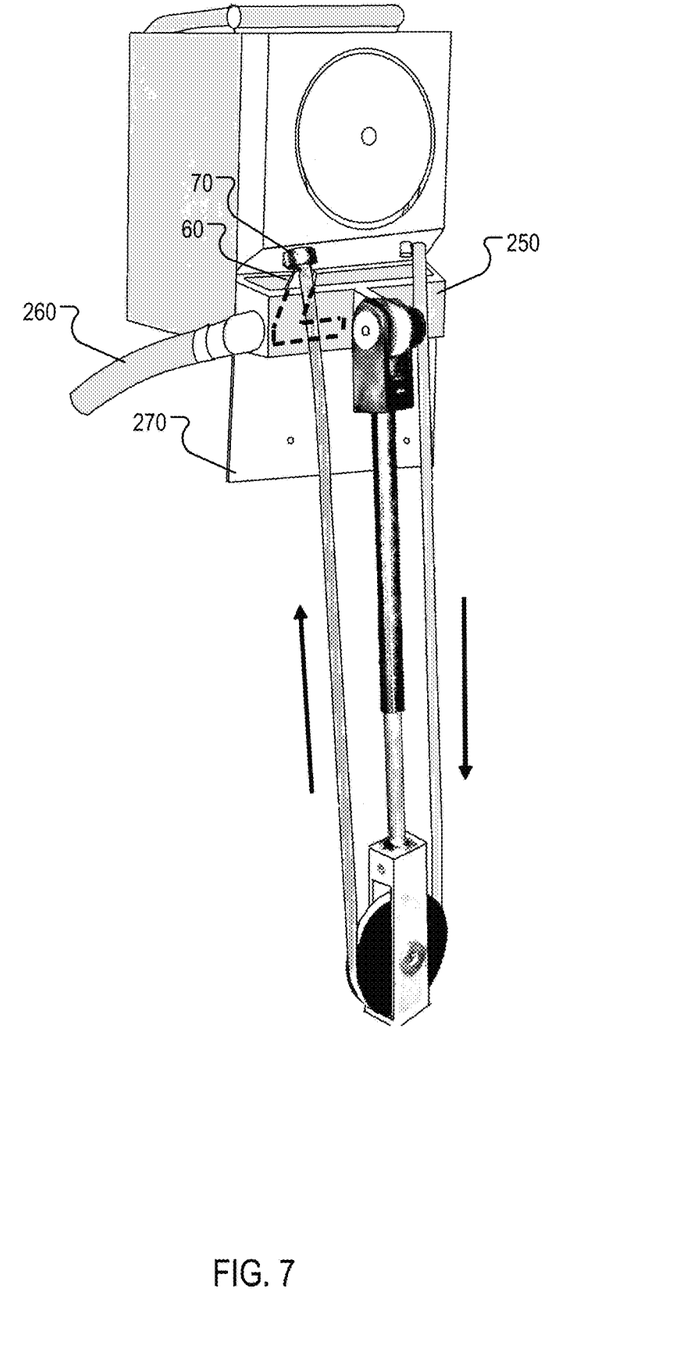
FIG. 7 is a perspective view of the skimming apparatus with a collection reservoir and drain.

FIG. 7 is a perspective view of the skimming apparatus 30 with a collection reservoir 250 and drain hose 260. In this implementation, the housing 30 includes a vertical mount plate 270 to facilitate mounting on the edge of a vessel or chamber, such as a sump. The mounting plate is optional. The reservoir 250 catches scraped fluids, and the drain hose 260 directs the fluid collected in the reservoir to a vessel of the user's choice.

Figure 8:
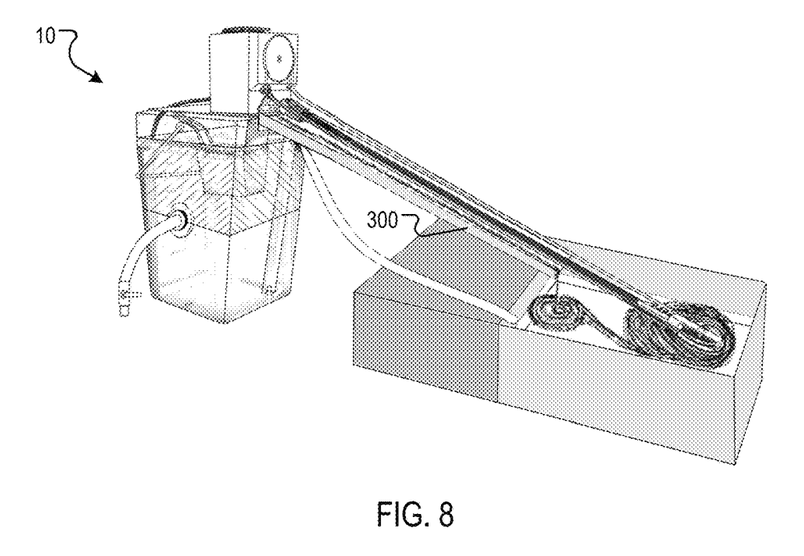
FIG. 8 is a perspective view of the skimming apparatus with a horizontal drip pan.

FIG. 8 is a perspective view of the skimming apparatus 10 with a horizontal drip pan 300. The drip pan 300 return dripping oils back to source vessel, reservoir or fluid body without spilling the waste fluids and substances on clean surfaces during the extraction process. The drip pan, in some implementations, facilities use of the skimming apparatus when horizontal access to the vessel is desired.

Figure 9:
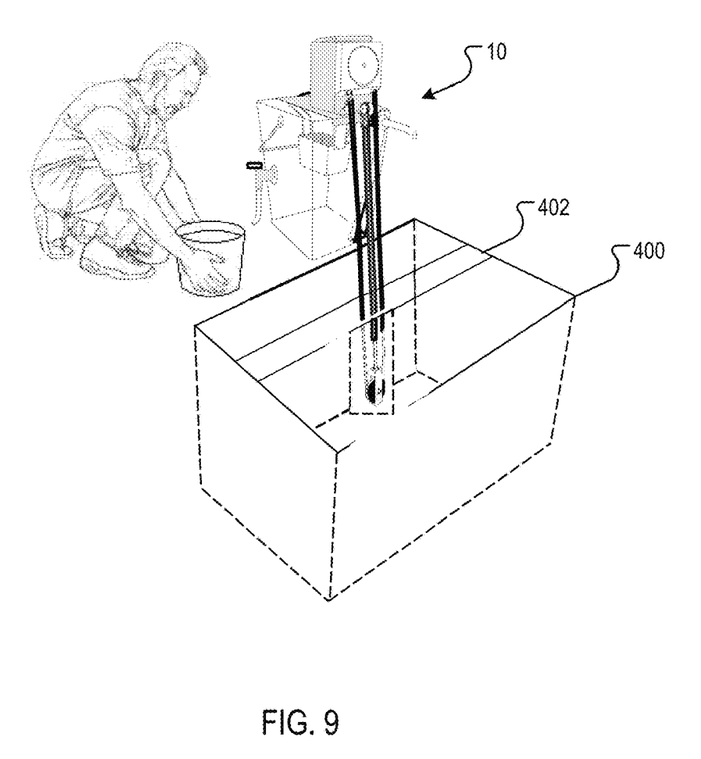
FIG. 9 is a perspective view of the skimming apparatus in use with an extended pivot arm.

FIG. 9 is a perspective view of the skimming apparatus 10 in use with an extended pivot arm. The pivot arm may come in various lengths, each accommodating particular applications. FIG. 9 also illustrates how the skimming apparatus 10 can skim from a sump 400 with a limited access vent 402 with the belting rubbing against the sides of the vent 402. This results in more efficient skimming than when a floating belt or a weighted belt is used.

Figure 10A:
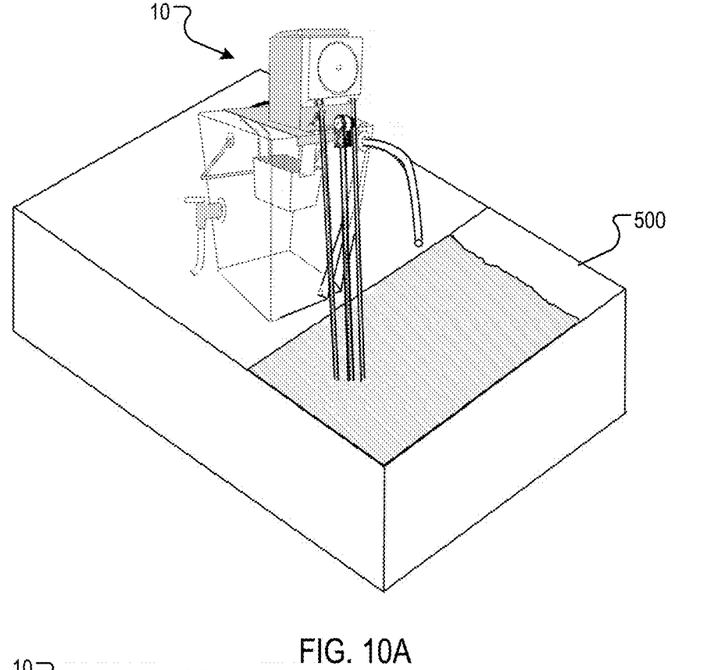
FIGS. 10A and 10B are perspective views of the skimming apparatus in use in two different positions with respect to a sump.
Figure 10B:
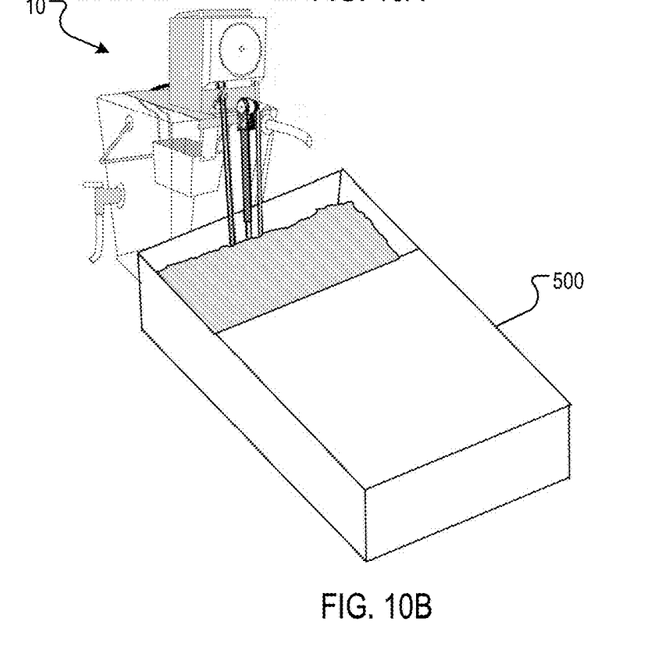

FIGS. 10A and 10B are perspective views of the skimming apparatus 10 in use in two different positions with respect to a sump 500. In the first position of 10A, the skimming apparatus has a pivot arm that is longer than the pivot arm of the skimming apparatus 10 of FIG. 10B.

Figure 11:
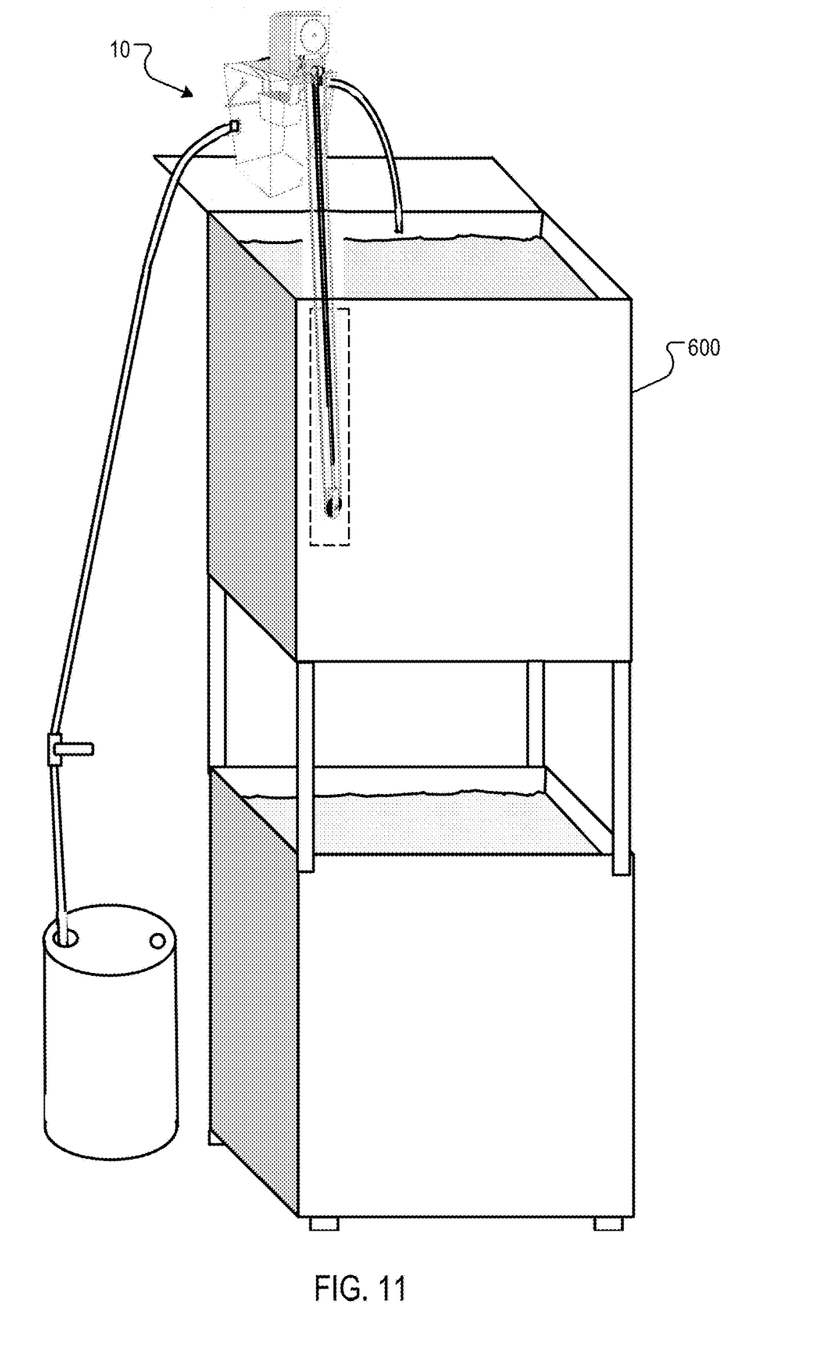
FIG. 11 is a perspective view of the skimming apparatus in use with an elevated tank and an extended pivot arm.

FIG. 11 is a perspective view of the skimming apparatus in use with an elevated tank 600 and an extended pivot arm. FIG. 11 illustrates that the pivot arm of the skimming apparatus 10 may be of such lengths to penetrate tank depths of 6-10 feet, or even more.

FIGS. 8-11 illustrate the versatility of the skimming apparatus 30 and its ability to providing skimming for a variety of difficult to reach vessels with limited access.

The examples of certain features above are illustrative and the subject matter is not limited to the examples above. The drive apparatus 20, for example, may be implemented using other diving systems. The drive apparatus may be two or more drive wheels; or may any other driving mechanism that facilities pulling the belting 50 through the belt ingress 21 and out the belt egress 34.

Other tension systems can also be used to tension the drive follower 90. For example, a static tensions system in which the drive follower 90 is manually pushed against the belting 50 and then locked into place in the pivot arm 80, e.g., by a locking screw, can be used.

While this specification contains many specific implementation details, these should not be construed as limitations on the scope of any inventions or of what may be claimed, but rather as descriptions of features specific to particular embodiments of particular inventions. The dimensions described and/or shown are illustrative, and dimensions may vary from those described and/or shown.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention received in the claims. The intended scope of the invention thus includes other structures, systems or methods that do not differ from the literal language of the claims, and further includes other structures, systems or methods with insubstantial differences from the literal language of the claims.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims.

What is claimed is:
1. A tensioned scraping apparatus, comprising:
a first half having a first end and a second end, and defining a first section of an adjustable interior aperture between the first end and the second end, and wherein the first end of the first half is substantially opposite the second end of the first half;
a second half having a first end and a second end, and defining a second section of an adjustable interior aperture between the first end and the second end, and wherein the first end of the second half is substantially opposite the second end of the second half;
a hinge connecting the first end of the first half and the second end of the second halve so that the first and second halves may be joined such that the first section and the second section form the adjustable interior aperture; and
a tensioned adjuster connected to the second end of the first half and the second end of the second half and that causes the respective second ends to be pulled towards each other, thereby causing the first half and the second half to be pulled towards each other;
wherein when the tension scraping apparatus is attached to a belting having a diameter that is greater than a diameter of the adjustable interior aperture when the tensioned scraper is not attached to the belting:
the adjustable interior aperture is tensioned matched to diameter of the belting; and
during actuation of a drive mechanism that pulls the belting, the tensioned adjuster allows for the adjustable interior aperture to adjust to match variations of the diameter of the belting.

2. The tensioned scraping apparatus of claim 1, wherein:
when the tensioned scraping apparatus is attached to the belting, it is not affixed to a housing of a device that includes the drive mechanism that pulls the belting; and
during actuation of the drive mechanism that pulls the belting, the tensioned scraping apparatus is pulled toward an ingress of the housing though which the belting is pulled, and then abuts the surface of the housing so that the belting traverses through the tensioned scraping apparatus and provides scraping of the exterior surface of the belting.

3. The tensioned scraping apparatus of claim 2, wherein the tensioned adjuster comprises a screw with an assisting spring.

4. The tensioned scraping apparatus of claim 2, wherein the first half and the second half each comprise semi-circular elements.

5. The tensioned scraping apparatus of claim 1, wherein the tensioned adjuster comprises a screw with an assisting spring.

6. The tensioned scraping apparatus of claim 1 wherein the first half and the second half each comprise semi-circular elements.

7. A system, comprising:
a tensioned scraping apparatus, comprising:
  a first half having a first end and a second end, and defining a first section of an adjustable interior aperture between the first end and the second end, and wherein the first end of the first half is substantially opposite the second end of the first half;
  a second half having a first end and a second end, and defining a second section of an adjustable interior aperture between the first end and the second end, and wherein the first end of the second half is substantially opposite the second end of the second half;
  a hinge connecting the first end of the first half and the second end of the second half so that the first and second halves may be joined such that the first section and the second section form the adjustable interior aperture; and
  a tensioned adjuster connected to the second end of the first half and the second end of the second half and that causes the respective second ends to be pulled towards each other, thereby causing the first half and the second half to be pulled towards each other; and
a belting having a diameter that is greater than a diameter of the interior aperture of the tensioned scraping apparatus when the tensioned scraping apparatus is not attached to the belting such that when the tensioned scraping apparatus is attached to the belting, the adjustable interior aperture is tensioned matched to diameter of the belting.

8. The system of claim 7, further comprising:
a housing having an ingress through which the belting is received; and
a drive mechanism connected to the belting and that during actuation pulls the belting;
wherein:
  during actuation of the drive mechanism that pulls the belting, the tensioned adjuster allows for the adjustable interior aperture to adjust to match variations of the diameter of the belting.

9. The system of claim 8, wherein:
the tensioned scraping apparatus is affixed to the belting and is not affixed to the housing; and
during actuation of the drive mechanism that pulls the belting, the tensioned scraping apparatus is pulled toward the ingress of the housing though which the belting is pulled, and then abuts a surface of the housing so that the belting traverses through the tensioned scraping apparatus and provides scraping of the exterior surface of the belting.

10. The system of claim 9, wherein the tensioned adjuster comprises a screw with an assisting spring.

11. The system of claim 9, wherein the first half and the second half each comprise semi-circular elements.

* * * * *